US012595101B2

(12) United States Patent
Grefenstein et al.

(10) Patent No.: US 12,595,101 B2
(45) Date of Patent: Apr. 7, 2026

(54) PAPER PACKAGING MATERIAL WITH IMPROVED RESUSPENDABILITY OF CELLULOSIC FIBRES

(71) Applicant: Constantia Pirk GmbH & Co. KG, Pirk (DE)

(72) Inventors: Achim Grefenstein, Altrip (DE); Markus Kick, Weiden (DE); Matthias Scheck, Waldthurn (DE); Thomas Kesmarszky, Weiherhammer (DE)

(73) Assignee: CONSTANTIA PIRK GMBH & CO. KG, Pirk (DE)

( * ) Notice: Subject to any disclaimer, the term of this patent is extended or adjusted under 35 U.S.C. 154(b) by 488 days.

(21) Appl. No.: 17/914,886

(22) PCT Filed: May 6, 2021

(86) PCT No.: PCT/EP2021/062082
§ 371 (c)(1),
(2) Date: Sep. 27, 2022

(87) PCT Pub. No.: WO2021/228695
PCT Pub. Date: Nov. 18, 2021

(65) Prior Publication Data

US 2023/0130087 A1 Apr. 27, 2023

(30) Foreign Application Priority Data

May 11, 2020 (DE) ..................... 10 2020 112 672.7

(51) Int. Cl.

| | |
|---|---|
| ***B65D 65/42*** | (2006.01) |
| ***B05D 7/00*** | (2006.01) |
| ***D21H 19/02*** | (2006.01) |
| ***D21H 19/12*** | (2006.01) |
| ***D21H 19/18*** | (2006.01) |
| ***D21H 19/32*** | (2006.01) |
| ***D21H 19/82*** | (2006.01) |
| ***D21H 19/84*** | (2006.01) |
| ***D21H 21/16*** | (2006.01) |
| ***D21H 27/10*** | (2006.01) |

(52) U.S. Cl.
CPC ............... *B65D 65/42* (2013.01); *B05D 7/54* (2013.01); *D21H 19/02* (2013.01); *D21H 19/12* (2013.01); *D21H 19/18* (2013.01); *D21H 19/32* (2013.01); *D21H 19/82* (2013.01); *D21H 19/84* (2013.01); *D21H 21/16* (2013.01); *D21H 27/10* (2013.01)

(58) Field of Classification Search
CPC ........ D21H 19/02; D21H 19/12; D21H 19/18; D21H 19/32; D21H 19/82; D21H 19/84; D21H 21/16; D21H 27/10; B05D 2203/22; B05D 7/54; B65D 65/42
See application file for complete search history.

(56) References Cited

U.S. PATENT DOCUMENTS

| | | | | |
|---|---|---|---|---|
| 5,006,383 | A * | 4/1991 | Achille | C08L 23/12 220/915 |
| 5,415,912 | A * | 5/1995 | Ushizaka | C09J 11/08 428/447 |
| 9,358,576 | B2 | 6/2016 | Anderson et al. | |
| 9,624,380 | B2 * | 4/2017 | White | C08G 59/302 |
| 2007/0218254 | A1 * | 9/2007 | Zhou | B41M 5/502 428/195.1 |
| 2012/0114917 | A1 * | 5/2012 | Anderson | B32B 3/10 427/508 |
| 2019/0077537 | A1 * | 3/2019 | Fortin | D21H 19/22 |

FOREIGN PATENT DOCUMENTS

| | | | | |
|---|---|---|---|---|
| EP | 3495138 A1 * | 6/2019 | | B32B 27/34 |
| EP | 3495138 B1 * | 3/2021 | | B65D 65/40 |
| WO | 2011089015 | 7/2011 | | |
| WO | 2013189550 | 12/2013 | | |
| WO | 2015136493 | 9/2015 | | |

OTHER PUBLICATIONS

India Office Action dated Feb. 21, 2023 issued in corresponding India Application No. 202227063721, with English translation.
German Office Action dated Jan. 29, 2021 issued in corresponding German Application No. 102020112672.7.
International Search Report and Written Opinion dated Jul. 26, 2021 issued in corresponding International Application No. PCT/EP2021/062082, with English summary.

* cited by examiner

*Primary Examiner* — Yan Lan
(74) *Attorney, Agent, or Firm* — ONELLO & MELLO P.C.

(57) ABSTRACT

The patent application relates to a paper-based packaging material with a carrier paper and a first coating arranged indirectly on at least one side of the carrier paper, wherein the first coating is a barrier layer and has an increased diffusion resistance to at least one substance selected from a group comprising fluid, gas, air, oxygen, carbon dioxide, nitrogen, inert gas, odorant, aromatic substance, water vapor, liquid, water, water-fat emulsion, fat, oil, mineral oil, and edible oil, odorant, flavorant, water vapor, liquid, water, water-fat emulsion, grease, oil, mineral oil, and edible oil individually or in combination, wherein the first coating is disposed between the carrier paper and a visually perceptible surface coating and directly contacts the surface coating. Furthermore, the invention relates to a package made of such a paper-based packaging material and a method of manufacturing the same.

15 Claims, No Drawings

PAPER PACKAGING MATERIAL WITH IMPROVED RESUSPENDABILITY OF CELLULOSIC FIBRES

The present invention relates to a paper-based packaging material comprising a carrier paper and a first coating arranged indirectly on at least one side of the carrier paper, wherein the first coating can be a barrier layer and is at least for one substance selected from a group comprising fluid, gas, air, oxygen, carbon dioxide, nitrogen, inert gas, odorant, aromatic substance, water vapor, liquid, water, water-fat emulsion, fat, oil, mineral oil (MOSH (Mineral Oil Saturated Hydrocarbons), MOAH (Mineral Oil Aromatic Hydrocarbons), POSH (Polyolefinic Saturated Hydrocarbons) and aromatic mineral oil hydrocarbons) respectively) and edible oil individually or in combination, comprising an enhanced diffusion resistance. Furthermore, the invention relates to a package made of such a paper-based packaging material and a method for its manufacture.

Various different packaging solutions are known from the state of the art. Packaging for foodstuffs are of particular importance, as special requirements are placed on the packaging materials used for this purpose. In order to meet the requirements with regard to hygiene, printability and barrier properties for contamination, foodstuffs have so far been predominantly packed in packaging made of plastics.

In view of the problems associated with the use of plastics for packaging, such as insufficient recyclability, pollution during thermal recycling and poor degradability, efforts are being made to replace plastics with alternative materials. This endeavour has been further increased in particular by the current discussion of plastic residues in the world's oceans and microplastics in the environment. Therefore, attempts have been made in the past to produce packaging for food from paper. In order to be able to meet the above-mentioned requirements regarding barrier properties, the papers were coated. However, the resulting paper laminates are usually difficult to recycle because the barrier layers shield the carrier paper in such a way that the cellulose fibres of the paper are only poorly accessible during the recycling process. The recycling process must therefore be carried out with increased effort, which, however, counteracts the endeavour to conserve resources. Under the usual conditions of the recycling process, such paper laminates therefore remain as large-format residual materials. The suspension of the cellulose fibres contained in the paper laminate into the pulp is only possible to a limited extent, if at all. The fibre content in the pulp is preferably 50%.

There is therefore a need for paper-based packaging material that meets the requirements from the food industry in terms of properties as a packaging material and, on the other hand, is also recyclable. In particular, the cellulose fibres of the paper should be resuspendable in such a way that they pass into the pulp.

Furthermore, there is a need for a process to produce such a paper-based packaging material.

Paper-based packaging that can be recycled with existing processes and equipment is also desired.

These objects are solved by the subject matters of the independent patent claims.

A paper-based packaging material according to the invention comprises a carrier paper and a first coating arranged indirectly on at least one side of the carrier paper. Preferably, it is a paper packaging material for food containers. However, other uses are not excluded. The first coating may be a barrier layer and thus has an increased diffusion resistance compared to paper for at least one substance. The substance is selected from a group comprising fluid, gas, air, oxygen, carbon dioxide, nitrogen, inert gas, odorant, flavorant, water vapor, liquid, water, water-fat emulsion, fat, oil, mineral oil (MOSH (Mineral Oil Saturated Hydrocarbons), MOAH (Mineral Oil Aromatic Hydrocarbons), POSH (Polyolefinic Saturated Hydrocarbons)) and edible oil individually or in combination. This makes it possible for this substance to not or only delayed diffuse through the paper or through the packaging. Of particular importance in this context is the reduction of diffusion of MOSH, fat, oxygen and water vapour (each individually or in combination) through the packaging material. Thus, the penetration of undesirable substances through the packaging towards the product can be prevented or delayed. It is also possible to reduce or prevent the escape of substances from the product through the packaging material into the environment. This can, for example, prevent an exchange of a gas atmosphere from an inert gas atmosphere to an oxygen-containing atmosphere inside the packaging and thus delay the oxidation of the product.

In the context of the present invention, an increased diffusion resistance for one of the above-mentioned substances compared to paper is to be understood in particular as the diffusion resistance of the barrier layer for this substance being greater than the diffusion resistance of kraft paper (in particular the carrier paper) for this substance by at least a factor ≥1.5, preferably ≥2, further preferably ≥3, particularly preferably ≥5 and especially preferably ≥10.

It is also conceivable to prevent the penetration of moisture in the form of water or water vapour in order to prevent or slow down softening or clumping of the product. A further important application is to prevent or retard the diffusion of fat and/or oil through the packaging. Particularly in the case of foodstuffs containing fat and/or oil, the diffusion of fat and/or oil through the packaging causes it to have visually recognisable oil or fat stains and is thus perceived by the customer as unattractive or even unappetising.

It is therefore essential to the invention that the first coating is arranged between the carrier paper and an optically perceptible surface coating and directly contacts the surface coating. This arrangement makes it possible, for example, that the substance inhibited by diffusion through the first layer can diffuse into the carrier paper, but cannot escape from the carrier paper through the first coating on the opposite side. The surface coating arranged on the opposite side to the carrier paper with respect to the first coating is thus effectively protected from contact with this substance. Contamination by this substance thus does not occur or only after a considerable delay.

However, a significant advantage of the arrangement described above is that when such a paper-based packaging material is recycled, the carrier paper has neither the first coating (or barrier layer) nor the surface coating on one side, which could hinder access of the solvent to the paper. Thus, it can be ensured that these coatings do not impede the passage of cellulose fibres from the carrier paper into the pulp, at least from one side. The solvent (e.g. water) can thus reach the carrier paper on one side without being hindered by the first coating (or the barrier layer) or the surface coating, wet it and dissolve cellulose fibres from the fibre composite of the carrier paper.

An optically perceptible surface coating in the sense of the present invention is to be understood as any coating which is optically perceptible on that side of the packaging material by a person (for example a customer). It is not necessarily required that this optically perceptible surface coating actually constitutes (either in sections or over the entire surface) an outer surface of the packaging material. Rather, the optically perceptible surface coating could be, for example, a monochrome or coloured print. This could also be covered by another layer, preferably an at least partially transparent layer. For example, such a layer could be a lacquer.

Unlike paper-based packaging materials known from the prior art, the carrier paper is thus not arranged between the first coating (or the barrier layer) and the surface coating that is visually perceptible to the customer, which would make it more difficult for the solvent to access the carrier paper from both sides. The resulting disadvantageous delayed wetting of the carrier paper and thus also the dissolving out of cellulose fibres can be avoided or at least drastically accelerated.

The first coating does not necessarily have to be placed directly on the carrier paper, although this is preferred. It is conceivable that an intermediate layer is arranged between the carrier paper and the first coating, for example a print, which is covered by a transparent first coating. A primer or a further barrier layer (which for example represents a (temporary) barrier for another substance) would also be conceivable.

In a preferred embodiment, the first layer of the paper-based packaging material comprises at least one layer selected from a group comprising moisture barrier, oxygen barrier, gas barrier, mineral oil barrier, aroma barrier, UV barrier, light barrier, fat diffusion barrier, fat sealing layer, sealing layer and adhesive layer. Such a layer allows the paper laminate to be adjusted to the respective product requirements, especially in the packaging industry.

Preferably, the first coating is a barrier coating. For example, this is selected from a group comprising PVDC coating, PVOH coating, PVOH-based coating and acrylate-based coating. In the case of a PVOH-based coating, this coating may be embedded between two other coatings that are diffusion inhibiting to moisture, such as polybutylene succinate (PBS). Preferably, sizing or hydrophobing agents based on the following are used, preferably cationic or cationised resin dispersions and resin-aluminium salt dispersions (wherein polyaluminium chloride (PAC) being particularly suitable for higher pH values as a cationic fixing agent in combination with polymeric retention agents), preferably AKD (alkenyl ketene dimer) dispersions, further preferably stabilised with cationic starch as a protective colloid and cationic polymers as a fixing agent or as promoter, particularly preferably ASA (Alkenyl Succinic Anhydride) dispersions, further preferably with cationic starch as stabiliser (to an increasing extent). Also preferred are cationic or anionic fluorocarbon resins or polyvinylidene chloride (PVDC) coating and preferably carboxymethylcellulose (CMC).

These coatings are preferred due to their barrier properties and ease of processing. These barrier layers can be arranged on top of each other in such a way that the individual layers are optionally chemically equivalent or chemically non-equivalent in structure. If necessary, it is preferred that the barrier coating comprises inorganic oxides such as aluminium oxide or silicon oxide. In particular, it is preferred that the barrier coating comprises inorganic fillers, such as preferably a siliceous substance, which is further preferably in powder form. In particular, it is preferred that the powder has an average particle size ($d_{50}$, sedigraph) which is <10 μm, preferably <3 μm and particularly preferably <1 μm. Complementary or independent of the size, it is preferred that the powder is three-dimensionally cross-linked under high density in a polymer. Alternatively or complementarily, the above-mentioned oxides could also be applied by vapour deposition as a separate layer. The layer thickness for these oxides is preferably 0.01 μm-0.5 μm. Alternatively or complementarily, for some embodiments, deposition of several metals is also possible, preferably at least one metal. If metallised surfaces are desired, the deposition of aluminium is preferred. The layer thickness for aluminium is preferably 0.008 μm-0.5 μm, preferably 0.01 μm-0.1 μm. Metal oxides, e.g. aluminium oxide or silicon oxide, can also be used instead of a metal. In addition, metals and/or metal oxide layers can be arranged on top of each other in such a way that the individual layers are optionally chemically equivalent or chemically non-equivalent. This means that one or several further barrier layers, such as an EVOH layer, can be arranged between the individual layers.

In a preferred embodiment, the carrier paper has a second coating on the second side opposite the first coating, which does not completely cover this side of the carrier paper. As an alternative to not completely covering the side opposite the first coating, a water-soluble coating could also be provided. This coating can be applied over the entire surface. Thus, if a second coating is provided, it is preferred that it already provides, before contact with solvent, sufficiently many and sufficiently large sections which are not sealed by this coating and thus the solvent can wet the carrier paper at least in these sections. At the latest upon contact with solvent, the second coating should expose sections that allow wetting of the carrier paper by the solvent. This could be ensured by dissolve or replace the second coating.

Preferably, however, some portions on the second side of the carrier paper are not covered by the second coating. Preferably, the second coating covers a maximum of 50%, preferably less than 50%, further preferably up to 40%, in particular preferably up to 30% of one side of the carrier paper.

At least one coating can contain channels that are completely permeable to water. These channels are preferably created selectively by laser perforation, for example as described in patent application EP3495138A1. During recycling of the paper-based packaging material, this allows the solvent (for example water) to penetrate the carrier paper from the second side. In particular, cellulose fibres of the carrier paper are transferred into the pulp. The process is known from the prior art.

Preferably, the second coating is a sealable coating. This allows this layer to be easily bonded to a further layer or a section of a packaging material. In particular, it is preferred that the second coating is a glue or adhesive.

In the case of a non-water soluble adhesive, channels may preferably be included to facilitate the passage of water through the adhesive layer.

Preferably, but not necessarily, the second coating is water-soluble and/or water-degradable. This property, in conjunction with the above-mentioned arrangement of the second coating on the side of the carrier paper opposite the first coating, enables the water to wet the carrier paper directly, even in the areas provided with the second coating, and to suspend cellulose fibres from the carrier paper (possibly in conjunction with mechanically applied energy) as soon as the second coating arranged there has been dissolved or degraded by water, at least in sections. Thus, these fibres are available again for a recycling process.

In a particularly preferred embodiment, the first and/or second coating comprises a hydrolysable coating, preferably applied over the entire surface, which is applied directly to the paper surface on at least one side of the carrier paper. The hydrolysis of the coating causes the coating to detach from the paper, preferably together with additional layers applied to the coating (e.g. printing, overprint varnish). Hydrolysis can already be triggered by cross-diffusion of water laterally over the cut edges of the carrier paper. The bond to the surface of the cellulose fibres created by thermal esterification with the functional polymer can be reversibly hydrolysed again in the alkaline environment in the recycling process, thus releasing the primer from the paper surface.

Depending on the roughness and porosity of the carrier paper, it may be advantageous to apply a primer to at least one side of the carrier paper. Thus, in a preferred embodiment, a primer is arranged on at least one side of the carrier paper. Preferably, the primer is printable with conventional printing inks (for example as a surface coating). The primer preferably comprises a polymer. Preferably, this is a polyethylene-dicarboxylic acid copolymer with preferably less than 60% by weight of dicarboxylic acid. The average molar mass of the polymer is preferably >60000 g/mol, preferably >70000 g/mol, further preferably >80000 g/mol. Complementarily or independently, the softening or glass transition temperature is preferably in the range of 120-200° C., preferably 130-190° C., in particular preferably 140-180° C. Such polymers have been shown to be particularly suitable with regard to their adhesive properties and printability.

It is possible, and in one variant particularly preferred, that the polymer of the primer comprises silicone-containing particles as described above, preferably polymethylsilsesquioxane. These are particularly suitable for filling cavities in the paper. This leads—in particular due to the small particle size—to a special compactness and/or evenness of the surface of the carrier paper, so that it is visually particularly appealing and appears of high value. In addition, the application and/or adhesion of a further layer, for example the surface coating, is favoured. In an advantageous embodiment, the Si-containing particles have a thermal stability that is >300° C.

In order to be able to optimally control the barrier properties, printability and paintability, an additional crosslinking with a bifunctional aliphatic glycidyl ether is provided in a preferred embodiment.

Preferably, the polarity of the paper coating is set to a defined value. This is preferably done by adding a sufficient amount, preferably 5 of glycidyl ether.

Because the cellulose fibres from the carrier paper can be brought into suspension by introducing a solvent from the first and/or second coating side, it is possible to degrade the carrier paper to such an extent that its structure collapses. At the latest as soon as this occurs, the stability of the first coating is preferably also reduced to such an extent that its structure also collapses. Independently of this, after resuspension of the cellulose fibres from the carrier paper (for example into a pulp), the separation of the first coating is made possible. This could be done for larger contiguous pieces of the first coating, for example, by sieves. However, it is preferred that residues of the first coating together with other impurities of the cellulose fibres (for example ink, printing ink or pigments) can be removed from the pulp or separated from the cellulose fibres by flotation.

In addition to improved recyclability, a paper-based packaging material of this kind offers in particular advantages in terms of good processability. In addition, the barrier effect against mineral oil, water vapour and gas diffusion is retained after forming and sealing of gusseted bags, sachets, stand-up pouches, wrappers, flowpacks, folding boxes and secondary packaging. These packaging materials are produced on packaging machines known from the prior art. Furthermore, a sufficiently high puncture resistance, bending stiffness, tensile stiffness, bursting strength, tensile strength, elongation at break, buckling tear resistance, tear strength and/or springback force (for example compared to cardboard) can be ensured by selecting the carrier paper, the chemical composition of the coatings and/or the layer thicknesses or by various variations thereof.

Preferably, the second coating is a glue, an adhesive or a sealing layer. In addition to the possibility of using this layer directly to produce a closed package, this offers advantages in terms of the environmental compatibility of such a paper-based packaging material. This also offers advantages from a processing point of view, as an adhesive layer could be directly glued to other areas of the packaging, for example to form a bag. It would also be conceivable to bond such a paper-based packaging material to a plastic container via the second coating in order to cover an opening present in the plastic container (for example a yoghurt pot) and thus close it.

Materials selected from a group including PVDC, PVOH, modified PVOH, acrylate, biopolymers, casein, starch, thermoplastic starch, sugar, cellulose, carboxymethyl cellulose, cellulose ether, xanthan gum, carrageenan, polypeptides, proteins, gelatin, pectin, guaran, chitin derivatives, chitosan derivatives (in particular N-carboxymethylchitosan), dextran, gluten, hyaluronic acid, polyhydroxyalkanoate-based water-soluble polymer, ionomers, polyurethane, polyacrylic acid, hydrophilic polyacrylate, polyacrylamide (in particular N-(2-hydroxypropyl)methacrylamide), polymethacrylic acid, copolymers of acrylic acid and/or methacrylic acid and their esters, polysulfonic acid, polyamine, amino resin, polyimine, polybetaine, polyethylene oxide, polyethylene glycol, homo-polyvinylpyrrolidone (in particular poly-N-vinylpyrrolidone), vinyl-pyrrolidones (in particular vinyl-pyrrolidone/vinyl laurate copolymers, vinyl-pyrrolidone/vinyl imidazole and vinyl-pyrrolidone/vinyl caprolactam), polyvinyl alcohol, polyvinyl alcohol/ethylene-vinyl alcohol copolymers, butenediol-vinyl alcohol copolymer (BVOH), acetalised polyvinyl alcohol, polyvinyl acetal, polyester, polyethyleneimine, quaternary ammonium compounds, polyoxazoline, polyphosphate, carboxypolymethylene, polyvinyl methyl ether, maleic anhydride and polyacrylamide, in each case individually, as a mixture and/or as copolymers, have proven to be particularly suitable as a second coating. Even though this is not mandatory for sufficient recyclability of the paper-based packaging material, these materials are preferred as they are—at least in some embodiments and/or combinations—water-soluble and/or water-cleavable or water-degradable (also referred to as "water-degradable" in the context of the present invention). This is advantageous in terms of particularly good environmental compatibility and conservation of resources. Biopolymers, in particular preferably casein, starch, in particular preferably thermoplastic starch, cellulose, gelatine, proteins, in particular preferably soya proteins and/or gluten, are preferred with regard to the greatest possible conservation of resources in the product, its production and its recycling. Furthermore, these materials are freely available and can be easily integrated into a paper-based packaging material.

Preferably, the paper-based packaging material has a thickness in the range of 30-300 μm, preferably 40-200 μm, particularly preferably 50-100 μm. These thicknesses have been shown to be advantageous because, on the one hand, they allow for a sufficiently strong carrier paper and its coating (with at least first coating and surface coating) and, on the other hand, they are thin enough to be handled by processing machines commonly used in the packaging industry. The weight of paper-based packaging material in the above mentioned thickness range is low, so that when transporting product packaged with such a paper laminate, transport costs are not disproportionately high and the material yield is high.

The surface coating is preferably a printing ink. In a further preferred embodiment, this could be an ink composition comprising nitrocellulose, PVB, PVC, PA and/or PUR. Such ink compositions have proven to be particularly suitable to be applied by gravure printing. Regardless of the ink composition used, the gravure printing process is preferred for applying an ink composition, as it produces a particularly homogeneous printed image and can be realised in a particularly fast, efficient and cost-effective manner on the process side. In the case of a partial cold seal application on the surface of the first coating or directly on the surface of the carrier paper, a dehesive varnish can additionally be applied to the surface of the second coating and/or over the printing ink. However, as an alternative or supplement to gravure printing, other printing techniques for applying (colour) layers may also be used within the scope of the invention. Conceivable and preferred for some applications and methods are, for example, flexographic printing, offset printing, UV flexographic printing, EB flexographic printing (wetflex), sheet-fed offset printing, UV/EB offset printing and/or digital printing. For these printing processes, inks other than those mentioned as preferred above may be advantageous.

Preferred is a paper-based packaging material in which the carrier paper has a thickness in the range of 25 μm-290 μm, preferably 45 μm-250 μm and particularly preferably 50 μm-200 μm. Depending on the other properties of the carrier paper (for example, tensile strength, basis weight, opacity, haptics, type of filler and/or filler content), such a carrier paper has sufficient tensile strength for use in the packaging industry, but on the other hand is sufficiently thin and light so that when used as packaging it neither adds much volume nor disproportionately increases the (transport) weight.

Preferably, the carrier paper comprises or is a base paper with a density >1 g/cm$^3$. This preferably comprises a primary fibre material obtained from deciduous and/or coniferous trees and/or a secondary fibre material obtained from recycled material. In this way and by means of measures known from the prior art, a sufficient strength of the carrier paper can be ensured at low weight. The methods required here are known to the skilled person.

Preferably, the carrier paper is selected from a group comprising biodegradable fibre materials, kraft paper, grass paper, cocoa fibre paper, straw paper, hemp paper, wood-free paper, tissue paper, coloured paper, thick printing paper, gravure printing paper, document paper, duplex paper, recycled paper, greaseproof paper, parchment paper, glassine, rope, vellum paper and transparent paper. It has been shown that these papers are particularly suitable for providing a stable bond to adjacent layers, especially to the first coating, in a paper-based packaging material. Nevertheless, the cellulose fibres of these papers are particularly easy to resuspend in the recycling process.

Optionally, and preferred for some applications, the carrier paper and/or at least one other paper layer has a coating. It is therefore a coated paper. Preferred coating colours are chalk, kaolin or casein-containing coating colours. The application of the coating is known to the skilled person from the prior art.

Preferably, the paper-based packaging material has a water permeation rate at 50° C. of at least 90 g/m$^2$-day, preferably ≥100 g/m$^2$-day, further preferably ≥110 g/m$^2$-day, particularly preferably ≥120 g/m$^2$-day. It has been shown that at this passage rate, sufficient protection of the products enclosed by such a packaging material can be ensured, but sufficient resuspendability in the pulp is provided. In particular, it is preferred that the above-mentioned values for the penetration speed are essentially or solely achieved by the composite of surface coating, first coating and carrier paper. If necessary, however, further layers may be provided to adjust the water passage velocity according to the respective requirements. If necessary, a second coating may be provided and/or a membrane and/or barrier layer regulating the passage speed.

A further solution to the object presented above is a package comprising a paper-based packaging material as described above. By using such a paper-based packaging material, it can be ensured with low weight and good visual perceptibility of the surface coating that, despite the barrier effect of the first coating, the cellulose fibres of the carrier paper are easily recyclable. Furthermore, despite the good accessibility of the carrier paper for potentially harmful substances on one side, it can be ensured for the surface coating that it is not damaged by these substances over a long period of time and thus the paper-based packaging material remains visually appealing.

The surface coating can be designed in almost any way. In particular, it can visually display important information for the customer, such as the product contained in the packaging. In order to keep this information accessible to a customer without having to open the packaging, it is preferred that this surface coating is arranged on the outside with respect to the carrier paper of the packaging. In particular, it is preferred that the surface coating is visible on the outside of the packaging. It could thus be arranged on the outside of the package. The surface coating can positively influence the appearance and/or the haptic of the packaging. The surface coating does not necessarily have to be the outermost layer of the packaging, but could possibly be overlaid (at least in sections) by one or further (preferably transparent) layers.

The two coatings can be applied to any side of the carrier paper in various combinations.

The second coating is preferably disposed on an inner surface of the packaging. This allows it—if it is an adhesive layer—to be used to bond sections of the paper-based packaging material to other sections of the paper-based packaging material or the packaging.

Preferably, a package as described above is a package selected from a group comprising stick pack, pouch, twist pack, doypack, stable pouch, pillow pouch, gusseted pouch, flow-wrap, tear-open, three-side seal (3 ss), four-side seal (4 ss), cube, lid, display package, blister, and pharmaceutical product package.

A further aspect essential to the invention relates to a method of making a paper laminate, preferably characterised by the following steps:

- providing a carrier paper,
- providing a first coating composition suitable for producing a barrier layer having an increased diffusion resistance to at least one substance which is preferably selected from a group comprising fluid, gas, air, oxygen, carbon dioxide, nitrogen, inert gas, odorant, aromatic substance, water vapour, liquid, water, water-fat emulsion, fat, oil, mineral oil, and edible oil individually or in combination,
- applying the first coating comprising the first coating composition to one side of the carrier paper, providing a surface coating compound, applying of the surface coating compound directly onto the first coating.

This method makes it particularly easy to produce a recyclable paper-based packaging material in which the carrier paper is accessible on at least one side to substances that promote the dissolution of cellulose fibres during recycling, but the surface coating is protected by the first coating compound from substances diffusing through the carrier paper from this side.

A variant of the method is preferred in which the carrier paper is provided, before and/or after the application of the first coating to a first side, with a second coating composition on the second side opposite the first side, which second coating composition does not cover the entire surface of this second side of the carrier paper.

The application of the coatings can be carried out independently of each other by suitable methods. The printing of a coating has proven to be particularly suitable. In this case, application weights of 0.5-100 g/m$^2$, preferably 0.8-70 g/m$^2$, particularly preferably 1-50 g/m$^2$, most preferably 3-30 g/m$^2$ have proven to be advantageous. Alternatively or in addition to printing a layer, a layer could also be applied by extrusion, smooth roll application, screen cylinder application, casting application. A further preferred variant is to apply the layer as a melt ("hot melt"). The latter two variants have proven to be particularly advantageous when higher application weights are desired. Printing the coating by extrusion or as a melt has proved to be particularly suitable when application weights of 1-100 g/m$^2$, preferably 2-70 g/m$^2$, particularly preferably 3-50 g/m$^2$ very particularly preferably 3-30 g/m$^2$ are desired.

In case of application of metals and/or metal oxides, vapour deposition in high vacuum is a preferred method. Preferably with a layer thickness of 0.01-0.1 μm.

In a preferred variant of the method, the method additionally comprises the step of assembling at least one section of the second coating to form an adhesive bond with other sections of the same paper laminate or other packaging material to form a package. This can be done—if the second coating is an adhesive or glue—without additional adhesive materials. Alternatively, the introduction of an adhesive or glue to form an at least temporarily stable adhesive bond between the above mentioned sections would also be advantageous. Alternatively, in some cases it is also advantageous that the second coating is thermally and/or chemically activatable and in this activated form is suitable for forming the desired, at least temporarily stable adhesive bond between the above-mentioned sections.

The first coating is preferably applied directly to the carrier paper. Alternatively, one or more intermediate layer (s) may be provided. Preferably, the application of a layer is carried out by a method selected from a group comprising dry lamination, wet lamination, thermal lamination, extrusion lamination, water-based adhesive lamination, solvent-based adhesive lamination and solvent-free adhesive lamination. However, wet lamination, in particular water-based adhesive lamination, is particularly preferred, as this avoids the use of organic solvents such as ethyl acetate. This is particularly advantageous with regard to production costs, occupational safety and disposal. At the same time, with a water-based adhesive lamination, it is possible to adjust the property of the paper-based packaging material so that good processability with conventional machines is possible.

If a cold seal lacquer is provided as a second layer (in sections) on the second side of the paper-based packaging material (for example, in order to bond this side to other sections for forming a package), the opposite side of the paper-based packaging material (for example, the surface coating) should preferably be provided with a release lacquer. The release lacquer should at least be located where this side could come into contact with the cold seal lacquer during manufacture or further processing. In this way, the undesired adhesion of these sections of the paper-based packaging material to each other (for example, during packaging as rolls) can be avoided.

Preferably, the release coating is a release coating based on a nitrocellulose/polyamide resin combination. This has proven to be particularly advantageous in a paper-based packaging material in terms of adhesion and behaviour in the recycling process.

Preferably, a second coating in the form of a varnish, glue, film or (co-) extrusion coating has a thickness of preferably 1-100 g/m$^2$, preferably 2-70 g/m$^2$, particularly preferably 5-50 g/m$^2$ very particularly preferably 3-30 g/m$^2$. Preferably, such a coating is applied to the carrier paper as part of the production of the paper-based packaging material prior to its further processing. Preferably suitable processes are selected from a group comprising laminating, varnishing, flexographic printing, screen printing, gravure printing and, in particular, preferably varnishing by means of a wide slot nozzle ("curtain coating"), or smooth roll or anilox roll application. These methods enable particularly thin second coatings, which can be applied in a way that is particularly gentle on materials and resources.

By selecting a carrier paper and/or the coatings, it is possible to adjust both the mechanical and barrier properties of the paper-based packaging material. The mechanical properties of the paper-based packaging material can be adapted to the respective needs in the context of use as packaging (for example with regard to format or machinability) by combining different types of paper and/or coatings.

To improve the barrier properties of the paper-based packaging material, for example against fat, it is preferred to select the carrier paper and/or a further paper layer independently from each other from a group of papers that have a high KIT value (i.e. a high fat tightness or fat penetration resistance) and a low porosity.

Exemplary paper-based packaging materials are described below. However, these compositions are merely examples without limiting the invention to these embodiments.

EXAMPLE 1: HEAT-SEALABLE PAPER-BASED PACKAGING MATERIAL

Layer Sequence:

a) Surface coating, b) Barrier layer, basis weight>1 g/m$^2$, comprising three-dimensional cross-linked silicone-containing powder (particle size<1 μm), c) Kraft paper, basis weight>40 g/m$^2$, d) Partially applied heat-seal lacquer, basis weight (in the coated sections)>3 g/m$^2$, The heat-sealing lacquer of layer d), which is only partially applied, allows water to wet the kraft paper (layer c)) in the non-coated areas and to dissolve cellulose fibres out of it during recycling. The extremely flexible surface coating cannot be damaged or destroyed by liquid (for example water, oil or grease) diffusing through the kraft paper (layer c)) when used as packaging due to the barrier layer b). Instead of the heat-sealing lacquer, a heat-sealing coating with a thickness of more than 5 μm could also be used. If the cold sealability of the sealing layer is desired, the heat seal lacquer applied only in sections could be replaced by a cold seal lacquer applied in sections, for example with a thickness of more than 3 μm.

EXAMPLE 2: HEAT-SEALABLE PAPER-BASED PACKAGING MATERIAL WITH PRINTING

Layer Sequence:

a) Optional topcoat, basis weight>1 g/m$^2$,
b) Printing ink,
c) Barrier layer, basis weight>1 g/m$^2$, comprising three-dimensional cross-linked silicone-containing powder (particle size<1 μm),
d) Kraft paper, basis weight>40 g/m$^2$,
e) Partially applied heat-seal lacquer, basis weight (in the coated sections)>3 g/m$^2$.

The optional topcoat according to a) can also be used to adapt the properties of the surface to special requirements with regard to its mattness, gloss, haptic or improved friction. Again, the only partially applied heat-seal lacquer allows solvent access to the carrier paper (layer d)) during recycling.

EXAMPLE 3: EXTRUSION-COATED PAPER-BASED PACKAGING MATERIAL WITH PRINTING

Layer Sequence:

a) Printing ink (partial)
b) Hydrolysable lacquer<3 g/m$^2$
c) Kraft paper basis weight>50 g/m$^2$, coated on one side, paper coating inwards
d) Extrusion primer (e.g. PBS)>3 g/m$^2$
e) PVOH>5 g/m$^2$
f) Extrusion top layer (e.g. PBS)>3 g/m$^2$
g) Heat-sealable lacquer, >5 g/m$^2$ optionally with barrier properties against water vapour (e.g. ionomer-based lacquer)

EXAMPLE 4: HEAT-SEALABLE, DOUBLE-SIDED HYDROLYSABLE, PAPER-BASED PACKAGING MATERIAL WITH PRINTING

Layer Sequence:

a) Printing ink (partial)
b) Hydrolysable lacquer<3 g/m$^2$
c) Kraft paper basis weight>40 g/m$^2$, coated on one side, paper coating inwards
d) Hydrolysable lacquer<3 g/m$^2$
e) Heat-sealable lacquer, >5 g/m$^2$ optionally with barrier properties against water vapour (e.g. ionomer-based lacquer)

EXAMPLE 5: HEAT-SEALABLE, DOUBLE-SIDED HYDROLYSABLE, METALLISED, PAPER-BASED PACKAGING MATERIAL WITH PRINTING

Layer Sequence:

a) Aluminium metallisation
b) Hydrolysable lacquer<3 g/m$^2$
c) Kraft paper basis weight>40 g/m$^2$, coated on one side, paper coating inwards
d) Hydrolysable lacquer<3 g/m$^2$
e) Heat-sealable lacquer, >5 g/m$^2$ optionally with barrier properties against water vapour (e.g. ionomer-based lacquer)

EXAMPLE 6: HEAT-SEALABLE, PAPER-BASED PACKAGING LAMINATE

Layer Sequence:

a) Kraft paper basis weight>40 g/m$^2$
b) Glue or adhesive (laser perforated if necessary)
c) Aluminium metallisation
d) Hydrolysable lacquer<3 g/m$^2$
e) Kraft paper basis weight>40 g/m$^2$, coated on one side, paper coating inwards
f) Hydrolysable lacquer<3 g/m$^2$
g) Heat-sealable lacquer, >5 g/m$^2$ optionally with barrier properties against water vapour (e.g. ionomer-based lacquer)

EXAMPLE 7: HEAT-SEALABLE, CHANNEL-PERFORATED, PAPER-BASED PACKAGING MATERIAL WITH SURFACE COATING

Layer Sequence:

a) Full surface coating<2 g/m$^2$ perforated with channels
b) Printing ink (partial)
c) Water-soluble primer<2 g/m$^2$ (e.g. cellulose derivative) perforated with channels
d) Kraft paper basis weight>40 g/m$^2$, coated on one side, paper coating inwards
e) Full-surface barrier lacquer (e.g. stryene acrylate-based)>5 g/m$^2$
f) Partial cold seal lacquer

EXAMPLE 8: HEAT-SEALABLE, CHANNEL-PERFORATED, PAPER-BASED PACKAGING MATERIAL WITH SURFACE COATING

Layer Sequence:

a) Paraffin wax based hotmelt (partial)
b) Printing ink (partial)
c) Water-soluble primer<2 g/m$^2$ (e.g. cellulose derivative) perforated with channels
d) Kraft paper basis weight>40 g/m$^2$, coated on one side, paper coating inwards
e) Full-surface barrier lacquer (e.g. stryene acrylate-based)>5 g/m$^2$
f) Paraffin wax based hotmelt (partial)

The applicant reserves the right to claim all features disclosed in the application documents as essential to the invention, provided they are individually or in combination new compared to the prior art. Furthermore, it is pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. A paper-based, recyclable packaging material, having a carrier paper and a first coating arranged indirectly on at least one side of the carrier paper, wherein the first coating has an increased diffusion resistance compared to paper with respect to at least one substance selected from a group comprising fluid, gas, air, oxygen, carbon dioxide, nitrogen, inert gas, odorant, aromatic substance, water vapour, liquid, water, water-fat emulsion, grease, oil, mineral oil (MOSH (Mineral Oil Saturated Hydrocarbons), MOAH (Mineral Oil Aromatic Hydrocarbons), POSH (Polyolefinic Saturated Hydrocarbons)) and edible oil, individually or in combination, characterised in that the first coating is disposed between the carrier paper and a visually perceptible surface coating and directly contacts the surface coating, wherein the carrier paper has, on a second side opposite the first coating, a second coating which does not cover this side of the carrier paper over its entire surface, wherein the second coating being a sealable coating, wherein the paper-based packaging material has a water permeation rate at 50° C. of at least 90 g/m$^2$-day.

2. The paper-based packaging material according to claim 1, characterized in that the first coating is a barrier layer and this is selected from a group comprising PVDC, PVOH, modified PVOH, acrylate, biopolymers, casein, starch, thermoplastic starch, sugar, cellulose, carboxymethyl cellulose, cellulose ether, xanthan, carrageenan, polypeptides, proteins, gelatine, pectin, guaran, chitin derivatives, chitosan derivatives, dextran, gluten, hyaluronic acid, polyhydroxyalkanoate-based water-soluble polymer, ionomers, polyurethane, polyacrylic acid, hydrophilic polyacrylate, polymethacrylic acid, copolymers of acrylic acid and/or methacrylic acid and their esters, polysulfonic acid, polyamine, amino resin, polyimine, polybetaine, polyethylene oxide, polyethylene glycol, vinyl-pyrrolidones, polyvinyl alcohol, polyvinyl alcohol/ethylene-vinyl alcohol copolymers, butenediol-vinyl alcohol copolymer (BVOH), acetalised polyvinyl alcohol, polyvinyl acetal, polyester, polyethyleneimine, quaternary ammonium compounds, polyoxazoline, polyphosphate, carboxypolymethylene, polyvinyl methyl ether, maleic anhydride and polyacrylamide, in each case individually, as a mixture and/or as copolymers.

3. The paper-based packaging material according to claim 2, characterised in that the visually perceptible surface coating on the side opposite the barrier layer is covered at least in sections, over the entire surface, by a protective layer.

4. The paper-based packaging material according to claim 1, characterized in that the second coating covers at most 50% of one side of the carrier paper.

5. The paper-based packaging material according to claim 1, characterized in that at least one coating contains channels that are completely permeable to water.

6. The paper-based packaging material according to claim 5, characterized in that these channels are created selectively by laser perforation.

7. The paper-based packaging material according to claim 1, characterized in that the second coating is a water-soluble coating.

8. The paper-based packaging material according to claim 1, characterized in that the paper-based packaging material comprises a further first and/or second hydrolysable coating, which is applied directly to a paper surface on at least one side of the carrier paper.

9. The paper-based packaging material according to claim 1, characterized in that a primer is arranged on at least one side of the carrier paper.

10. The paper-based packaging material according to claim 9, characterized in that the primer comprises a polymer, which is a polyethylene-dicarboxylic acid copolymer.

11. The paper-based packaging material according to claim 9, characterized in that a polymer of the primer comprises silicone-containing particles.

12. The paper-based packaging material according to claim 11, characterized in that the polymer of the primer comprises polymethylsilsesquioxane.

13. The paper-based packaging material according to claim 11, characterized in that the silicone-containing particles have a thermal stability that is >300° C.

14. The paper-based packaging material according to claim 1, characterized in that for the first coating an additional crosslinking with a bifunctional aliphatic glycidyl ether is provided to optimally control barrier properties, printability and paintability.

15. The paper-based packaging material according to claim 1, characterized in that the polarity of the first coating is set to a defined value, which is done by adding 5% of glycidyl ether.

* * * * *